(12) United States Patent
Knorr (10) Patent No.: US 8,065,291 B2
(45) Date of Patent: Nov. 22, 2011

(54) ON-LINE GEOGRAPHICAL DIRECTORY

(75) Inventor: John Knorr, Emerald (AU)

(73) Assignee: Siss Business Systems Limited, Traralgon (AU)

( * ) Notice: Subject to any disclaimer, the term of this patent is extended or adjusted under 35 U.S.C. 154(b) by 84 days.

(21) Appl. No.: 12/320,694

(22) Filed: Feb. 2, 2009

(65) Prior Publication Data

US 2009/0150389 A1    Jun. 11, 2009

Related U.S. Application Data (63) Continuation of application No. 11/330,177, filed on Jan. 12, 2006, now abandoned, which is a continuation-in-part of application No. 10/232,401, filed on Sep. 3, 2002, now abandoned, which is a continuation of application No. PCT/AU01/00221, filed on Mar. 2, 2001.

(30) Foreign Application Priority Data

Mar. 3, 2000 (AU) ...................................... PQ5997

(51) Int. Cl.
G06F 17/30 (2006.01)
(52) U.S. Cl. ......... 707/710; 707/919; 707/706; 707/918
(58) Field of Classification Search .................. 707/710, 707/706, 918, 919; 709/223
See application file for complete search history.

(56) References Cited

U.S. PATENT DOCUMENTS

| | | | |
|---|---|---|---|
| 5,682,525 A | 10/1997 | Bouve et al. | |
| 5,839,088 A | 11/1998 | Hancock et al. | |
| 5,907,840 A * | 5/1999 | Evans | 707/706 |
| 5,930,474 A | 7/1999 | Dunworth et al. | |
| 5,944,769 A | 8/1999 | Musk et al. | |
| 5,948,040 A | 9/1999 | DeLorme et al. | |
| 5,991,739 A | 11/1999 | Cupps et al. | |
| 6,092,076 A | 7/2000 | McDonough et al. | |
| 6,148,260 A | 11/2000 | Musk et al. | |
| 6,163,781 A * | 12/2000 | Wess, Jr. | 707/710 |

(Continued)

FOREIGN PATENT DOCUMENTS

DE      197 43 705 C1    12/1998

(Continued)

OTHER PUBLICATIONS http://www.yellowpages.co.nz/index.html, Dec. 11, 2002.

(Continued)

*Primary Examiner* — Thuy Pardo
(74) *Attorney, Agent, or Firm* — Oliff & Berridge, PLC (57) ABSTRACT

A method is provided for categorizing businesses, organizations and individuals in order to facilitate geographically-based searching over the Internet. The method includes entering in a database the names of businesses, organizations and/or individuals, for each name entry registering a geographical location identifier, the geographical location identifier indicating the precise geographical location at which the corresponding business, organization or individual is located, for each name entry registering further information such as contact details and a description of the goods or services offered by the business, organization or individual, and for at least some of the name entries adding credential information in respect of the business, organization or individual, or the goods or services offered by the business, organization or individual. A user interrogates the database by nominating a catchment area by reference to one or more geographical points to identify name entries within the catchment area nominated by the user.

20 Claims, 3 Drawing Sheets

U.S. PATENT DOCUMENTS

| | | | |
|---|---|---|---|
| 6,202,023 B1 | 3/2001 | Hancock et al. | |
| 6,205,443 B1* | 3/2001 | Evans | 707/706 |
| 6,233,523 B1 | 5/2001 | Sood | |
| 6,240,360 B1 | 5/2001 | Phelan | |
| 6,240,425 B1 | 5/2001 | Naughton | |
| 6,263,343 B1 | 7/2001 | Hirono | |
| 6,269,368 B1* | 7/2001 | Diamond | 707/919 |
| 6,295,528 B1 | 9/2001 | Marcus et al. | |
| 6,363,392 B1 | 3/2002 | Halstead et al. | |
| 6,381,603 B1 | 4/2002 | Chan et al. | |
| 6,401,034 B1 | 6/2002 | Kaplan et al. | |
| 6,408,307 B1 | 6/2002 | Semple et al. | |
| 6,438,561 B1 | 8/2002 | Israni et al. | |
| 6,480,843 B2* | 11/2002 | Li | 707/918 |
| 6,552,682 B1 | 4/2003 | Fan | |
| 6,577,714 B1 | 6/2003 | Darcie et al. | |
| 6,618,727 B1* | 9/2003 | Wheeler et al. | 707/748 |
| 6,629,136 B1 | 9/2003 | Naidoo | |
| 2002/0059161 A1* | 5/2002 | Li | 707/919 |
| 2002/0173981 A1 | 11/2002 | Stewart | |
| 2005/0283503 A1* | 12/2005 | Hancock et al. | 707/710 |
| 2007/0043846 A1* | 2/2007 | Grayson et al. | 709/223 |
| 2008/0120129 A1 | 5/2008 | Seubert et al. | |

FOREIGN PATENT DOCUMENTS

| | | |
|---|---|---|
| EP | 0 838 771 A2 | 4/1998 |
| WO | WO 97/07467 | 2/1997 |

OTHER PUBLICATIONS http://www.yellowpages.co.nz/quick/search?view=loc&page=map&loc=124, Dec. 11, 2002.

http://www.yellowpages.co.nz/search/advanced-search.html, Dec. 11, 2002.

http://www.yellowpages.co.nz/maps/, Dec. 11, 2002.

http://www.yellowpages.co.nz/advertise/, Dec. 11, 2002.

http://www.yellowpages.co.nz/advertise/banners.html, Dec. 11, 2002.

http://web.archive.org/web/*/http://www.yellowpages.co.nz, Aug. 7, 2003.

http://www.wises.co.nz/main.html, Aug. 7, 2003.

http://www.wises.co.nz/locator/, Aug. 6, 2003.

http://www.whereis.com.au, May 26, 2004.

http://maps.yahoo.com/.maps?t=a, May 26, 2004.

Qiao et al., "The Discussion on Building the WWW Digital Map Library," Computer Engineering, vol. 25, No. 7, Jul. 1999 (w/ English language abstract).

Webpages of http://www.toothpick.com/Dentist, copyright 1997. Nov. 6, 2005.

Tse, "Consumers Can Now Research Dentists Credentials and Sanctions Online at ChoicePoint," webpages of http://www.urlwire.com/news/031302.html, URLwire for Wednesday, Mar. 13, 2002.

* cited by examiner

ON-LINE GEOGRAPHICAL DIRECTORY

This is a Continuation Application of application Ser. No. 11/330,177, filed Jan. 12, 2006, which is a Continuation-in-Part of application Ser. No. 10/232,401 filed Sep. 3, 2002, which in turn is a Continuation of International Application No. PCT/AU01/00221 filed Mar. 2, 2001. The entire disclosure of the prior applications is hereby incorporated by reference herein in its entirety.

This invention relates to an on-line geographical or spatial directory. It also relates particularly but not exclusively to a method of categorising items in order to facilitate information retrieval. It further relates particularly but not exclusively to a method and system for indexing information so that Internet users may locate relevant information according to geographical or spatial location. It also relates particularly but not exclusively to a method and system of delivering geographically based advertising over the Internet.

BACKGROUND

Over the past decade, the Internet has become a source of a vast amount of information. Unfortunately, there is no agreed method of indexing or categorisation, so that it is very difficult to identify and locate most of the information which may be relevant to a particular query. Two of the most common ways of locating relevant information on the Internet are to locate a URL in a printed publication or television advertisement and to enter it into a web browser to "visit" the URL and obtain the desired information, or to use one of the many Internet search engines.

The Internet search engines typically maintain indices based on key words which appear on web pages. When some key words are typed into a search engine, the search engine produces a list of hypertext links to documents having those key words. This is a good way of finding some general information on a particular subject, but it is not an effective way of finding all relevant information.

There are advantages and disadvantages to doing business on the Internet. One advantage is that the Internet provides rapid and inexpensive access to an enormous number of different potential customers. This is particularly useful when a business involves selling items such as books or CDs, which have universal appeal and are non-perishable and relatively inexpensive to ship to anywhere in the world. A disadvantage is that the Internet is less suitable for businesses which have a more local customer base, because it does not provide easy ways of targeting local customers. Similarly, many customers have difficulty in identifying Internet businesses are within their geographical location. For example, a pizza shop might have a customer base located exclusively within a 5 km radius, but an Internet search on "pizza shops" might bring up thousands of such shops from all round the world, so that shops in the relevant geographical location are lost amongst the large number of irrelevant ones.

Indeed, the majority of businesses and organizations have a geographically defined constituency, and are not therefore inherently suited to the presently available Internet search engines. Some search engines such as Altavista allow a search to be confined to a particular country, and Yahoo goes further, allowing a search to be restricted according to country, state and city. However, in many cases, a restriction to a particular city is still not enough. In the case of a pizza shop, a list of all pizza shops in a particular city would still contain far too many shops which were not within a 5 km radius of the potential customer.

One way for a person to attempt to overcome this problem when using an Internet search engine is to use the locality of the particular business as a key word. Thus, the person might type "Pizza Shop Preston" into the search engine. However, this is still unsatisfactory because all relevant pizza shops may not have used the locality name "Preston" as a key word on their Internet web sites, and relevant shops in neighbouring localities will not be located. Further, there may be multiple localities throughout the world with the same locality name. For example, there are approximately thirty eight localities which have the name "Preston" in the United States.

An attempt has been made to address this problem in U.S. Pat. No. 5,930,474, which relates to an Internet organiser for accessing geographically and topically based information. The organiser disclosed in that patent essentially requires the breaking down of a city into various localities, and the compilation of "locality guides" for the localities, with each business being listed in a particular locality guide. This is useful to some extent, in a similar manner to a neighbourhood telephone directory. However, it still has numerous shortcomings. It fails to distinguish between different types of goods and services for which different locality sizes are appropriate. For example, a person may only be prepared to travel up to 2 km to do the daily grocery shopping, but may be prepared to travel up to 20 km to purchase an item of furniture. A builder of a major project might be happy to have pre-mixed concrete delivered within a maximum of 20 km due to the perishable nature of the product. On the other hand prefabricated steelwork can be transported hundreds of kilometres without deterioration and without a major cost disadvantage. Further, a business classified as being just within the borders of a particular locality may by that classification miss out on business which it might otherwise have gained from a nearby customer who is classified as residing just within the border of an adjoining locality.

An object of the present invention is to overcome of alleviate one or more of the problems present in the prior art.

SUMMARY

According to an aspect of the present invention, there is provided a method of categorising businesses, organizations and individuals in order to facilitate geographically-based searching over the Internet, comprising the steps of:

(a) entering in a database the names of businesses, organizations and/or individuals;

(b) for each name entry registering a geographical location identifier, the geographical location identifier indicating the precise geographical location at which the corresponding business, organization or individual is located;

(c) for each name entry registering further information such as contact details and a description of the goods or services offered by the business, organization or individual;

(d) for at least some of the name entries adding credential information in respect of the business, organization or individual, or the goods or services offered by the business, organization or individual;

wherein a user interrogates the database by nominating a catchment area by reference to one or more geographical points to identify name entries within the catchment area nominated by the user, and wherein the credential information is added by another business, organization or individual registered in the database.

"Credential information" as referred to in the patent specification means a word, code, qualification or other indicator which is associated in the database with a name entry. For example, the credential information may be used to indicate all businesses entered in the system that sell BRAND X clothing and footwear, or all individuals who are members of a particular professional organisation or trade association.

The business, organization or individual (is referred to as a "credentialing entity").

In general, the database entry associated with each business, organization or individual can be viewed in the form of a web page, and a "credentialed business" (a business to which a credential has been applied by a credentialing entity) can be discovered by a user through:

(a) the web page of the credentialing entity, which includes links to businesses which sell the credentialing entity's goods or services; or (b) the web page of the credentialing entity, which provides a verification of a skill or qualification or membership; or (c) a search for credentialed businesses, where the credentialing entity has enabled such a search; or (d) the web page of the credentialing entity through a process of restricted access, such as where the credentialing entity charges for access to such information.

According to another aspect of the present invention, there is provided an Internet site for facilitating geographically-based searching over the Internet, comprising:

(a) a database having a plurality of name entries corresponding to the names of businesses, organizations and/or individuals, each name entry having a geographical identifier indicating the precise geographical location at which the business, organization or individual is located, each name entry further being associated with additional information such as contact details and a description of the goods or services offered by the business, organization or individual;

(b) a credential input component to enable one registered business, organisation or individual to add credential information in respect of one or more other registered businesses, organizations or individuals, or the goods or services offered by the businesses, organizations or individuals; and (c) a search catchment area nominating component whereby a user nominates a search catchment area by reference to one or more geographical points to search the database to identify name entries associated with businesses, organisations or individuals located within the search catchment area nominated.

According to yet another aspect of the present invention, there is provided a system for facilitating geographically based searching for businesses, organizations and individuals over the Internet, the system comprising:

(a) a database having a plurality of name entries corresponding to the names of businesses, organizations and/or individuals;

(b) a geographical identifier input component for entering a geographical location identifier for each name entry indicating the precise geographical location at which the business, organization or individual is located;

(c) a data input component for entering information such as contact details and a description of the goods or services offered by the business, organization or individual for each name entry;

(d) a credential input component to enable one registered business, organisation or individual to add credential information in respect of another registered business, organization or individual, or the goods or services offered by the business, organization or individual;

(e) a search catchment area nominating component whereby a user nominates a search catchment area by reference to one or more geographical points to search the database to identify name entries associated with businesses, organisations or individuals located within the search catchment area nominated.

In one particular embodiment, the business, organisation or individual that added the credential information is a brand owner and the credential information indicates businesses, organisations and/or individuals that resell goods or services under the brand.

In another embodiment, the business, organisation or individual that added the credential information is a credit card provider and the credential information indicates businesses, organizations and/or individuals that accept the credit card associated with the credit card provider In yet another embodiment, the business, organisation or individual that added the credential information is a professional or industrial organisation and the credential information indicates businesses, organizations and/or individuals that are members of the professional or industrial organisation.

In an alternative embodiment, the business, organisation or individual that added the credential information is a credit reference agency and the credential information includes financial data pertaining to other registered businesses, organizations and/or individuals.

The credential information may be accessible to a user only through the website of the business, organisation or individual that added the credential information.

In another form of the invention, the credential information is only accessible to a user who has paid to access the credential information.

According to an aspect of the present invention, there is provided a method of categorising businesses, organizations and individuals in order to facilitate geographically-based searching over the Internet, including the steps of:

(a) registering in a database the names of businesses, organizations and/or individuals;

(b) for each name entry, registering a geographical location identifier; and (c) for each name entry, optionally registering further information such as address, telephone number, and information about the goods or services offered by the business, organization or individual;

wherein each geographical location identifier indicates the precise geographical location at which the business, organization or individual is located.

The geographical location identifier may be any suitable type of identifier. In one suitable arrangement, each geographical location identifier corresponds to:

(i) a precise point of latitude and longitude where the business, organization or individual in question occupies a small area of land; or (ii) an area of points of latitude and longitude where the business, organization or individual occupies a larger amount of land.

In a particularly preferred arrangement, the database operates in conjunction with a secondary database of known street addresses and geographical co-ordinates such that, when a new name is entered in the database, a geographical location identifier is provided for that name by entering a street address for the name, which the secondary database can use to provide geographical co-ordinates for the name.

In a preferred arrangement, there are numerous databases at a number of Internet sites located in different countries or regions, each of the Internet sites containing information relevant to businesses, organizations and/or individuals in its country or region.

According to an aspect of the invention, there is provided an Internet site for facilitating geographically-based searching over the Internet, including:

(a) a database having the names of businesses, organizations and/or individuals;

(b) the database further having a geographical location identifier for each name entry;

wherein each geographical location identifier indicates the precise geographical location at which the business, organization or individual is located.

In one arrangement, each geographical location identifier corresponds to:

(i) a precise point of latitude and longitude where the business, organization or individual in question occupies a small area of land; or (ii) an area of points of latitude and longitude where the business, organization or individual occupies a larger amount of land.

In another arrangement, the database operates in conjunction with a secondary database of known street addresses and geographical co-ordinates such that, when a new name is entered in the database, a geographical location identifier is provided for that name by entering a street address for the name, which the secondary database can use to provide geographical co-ordinates for the name.

The Internet site preferably further includes a search engine which allows an Internet user to conduct a search of the database to find all entries matching user-specified criteria located within a user-specified distance from a user specified point. Thus, for example, a person can use the search engine to locate all grocery stores within a 2 km radius of his or her house, or to locate all furniture stores within a 20 km radius. As a further example, a person visiting an unfamiliar city might use the system to locate the closest hotel to a particular place of business.

It will readily be appreciated that the system can be used for almost any type of geographical or spatial searching and accordingly the invention is not limited to those so far listed. The system may search from any point within any predetermined distance. For example, the system may search within a specified distance of a particular object such as a road or coastline. The system may also search by drawing an area on the map, preferably with a mouse, and searching that area. Another alternative method of searching is by nominating various points and searching the area contained within those points, these points may be defined by particular objects such as roads.

If the Internet site is programmed with various different types of geographical boundaries such as council boundaries, postal area boundaries and electoral district boundaries, and different geographical features such as streets, shopping centres and public facilities, a user can perform numerous different types of searches such as:

"Find all the scout halls in the municipality of X"

"Find the nearest Post Office"

"Find all the cake shops in X Street"

"Find all the shops that sell X brand shoes in Y shopping centre"

There are numerous different ways in which the method and database system of the invention can be used to generate revenue. Businesses and organizations can make a payment in order to be listed in the database. Persons undertaking a search can be charged a fee for the search. Alternatively, revenue can be generated through advertising on the search engine site and on search results pages. In order to increase the effectiveness of advertising, the subject matter of advertisements can be varied to accord with the subject matter of searches being made.

According to an aspect of the invention, there is provided a method of categorising items in order to facilitate information retrieval, including the steps of:

(a) registering in a database the identity of the item;

(b) for each entity, optionally registering further information about the item; and (c) registering in the database a spatial co-ordinate identifier corresponding to the location of each item wherein each spatial co-ordinate indicates the precise spatial location identifier of the entity at which the item is located.

Preferably, the item in question is defined by co-ordinates specified relative to each one of three dimensions. Alternatively, the item in question may be defined by an area of spatial co-ordinates, each spatial co-ordinate being specified as relative to each one of three dimensions. In a further alternative, the item in question can be defined by a volume of spatial co-ordinates, each spatial co-ordinate being specified as relative to each one of three dimensions.

According to the Invention in an aspect there is provided a method of delivering geographically based advertising over the Internet, including the steps of:

(a) registering in a database one or more goods or services being offered by one or more advertisers;

(b) for each good or service offered by the advertiser, registering an advertiser geographical area indicating the area in which the advertiser wishes to receive customers;

(c) determining an Internet user geographical location identifier, being the precise geographical location of the Internet user;

(d) displaying to the Internet user an advertisement, the advertisement displayed being selected from one or more advertisements for goods or services wherein the geographical location of the Internet user is within the advertiser geographical area corresponding to one or more of the goods or services presented in the advertisement.

Preferably, the advertiser geographical area is specified by precise points of latitude and longitude. The Internet use geographical location identifier may also be specified by a precise point of latitude and longitude.

The Internet user may also supply information including their Internet user geographical location identifier. Alternatively, the party presenting the advertisement may track the Internet user to determine their geographical location and target advertising accordingly.

BRIEF DESCRIPTION OF THE DRAWINGS

The invention will hereinafter be described in greater detail with reference to the attached drawings which show an example form of the invention. It is to be understood that the particularity of those drawings does not supersede the generality of the preceding description of the invention.

DETAILED DESCRIPTION OF EMBODIMENTS

Figure 1:
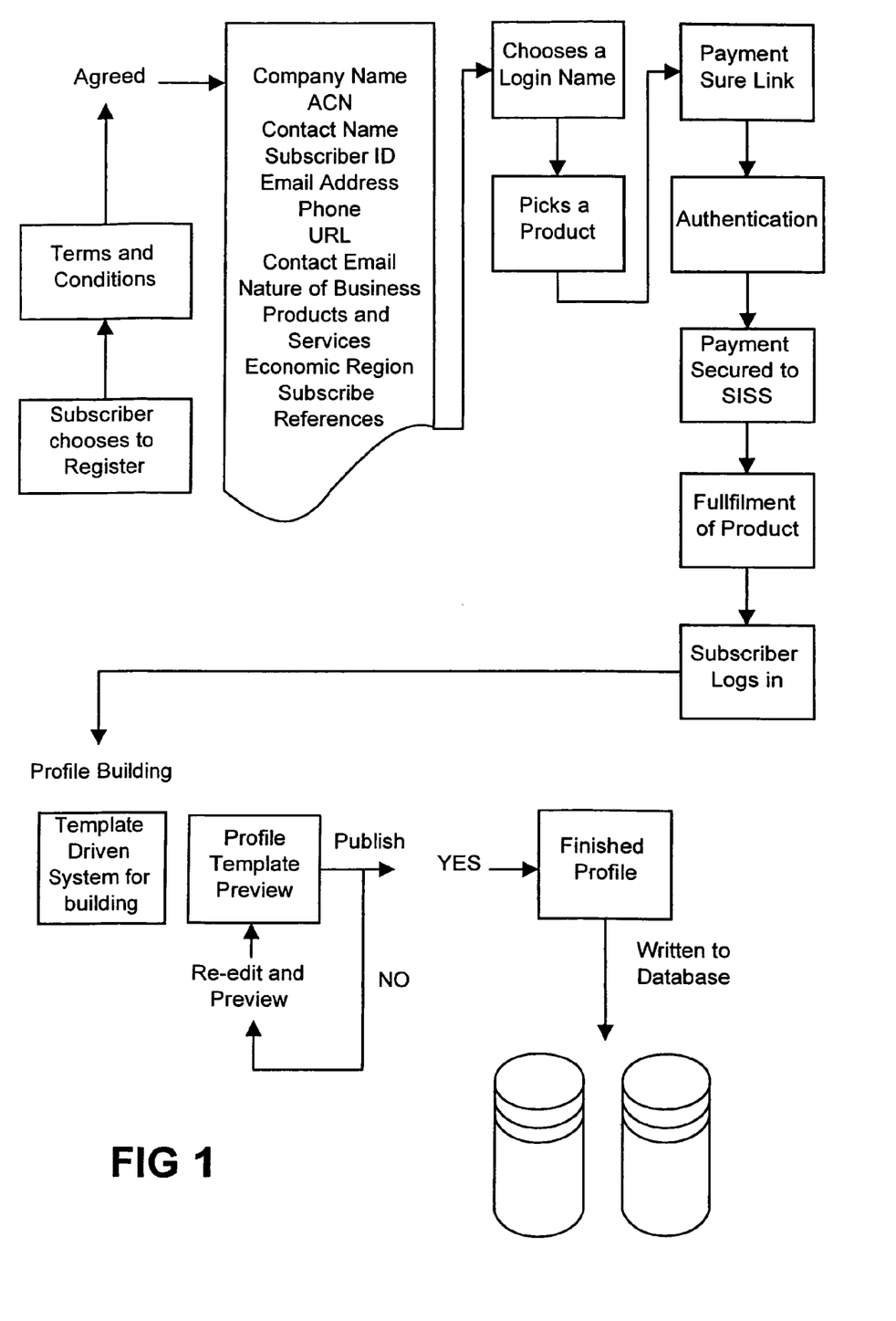
FIG. 1 is a flowchart of the process of registering a business, organization or individual (a "subscriber") in the database.

An overview of a system according to an embodiment of the invention can be gained by working through the subscriber registration process illustrated in FIG. 1. Firstly, a subscriber chooses to register, and agrees to the terms and conditions. The subscriber is then prompted to enter contact details including items such as company name, contact name, subscriber ID, email address, phone, URL, contact email, nature of business, products and services, economic region, and subscriber references. The subscriber then chooses a login name, passes through a payment process, and logs into a "subscriber's profile page".

The subscriber then creates a profile from a template. The subscriber's profile includes the following elements which can be seen by "visitors":

- Locations for the presentation of logos, drawings or photos
- Information that is vital for the business such as name, address, phone, fax, email, etc.
- Click points that open sub files of information of importance to the business such as products and services; the sub files may contain text or images
- A click point to show the business location on the mapping system
- A facility to leave a message for the subscriber
- A facility to leave an email message
- Other information
- A click point or clickpoints to obtain further information (via hot links)

An Internet user who is examining a subscriber's profile can click on a mapping icon, and the mapping system will bring up the relevant map at the lowest perspective and display the "spike" (the precise location of the subscriber's business). From there the user can pan, scroll or more to a higher elevation.

Figure 2:
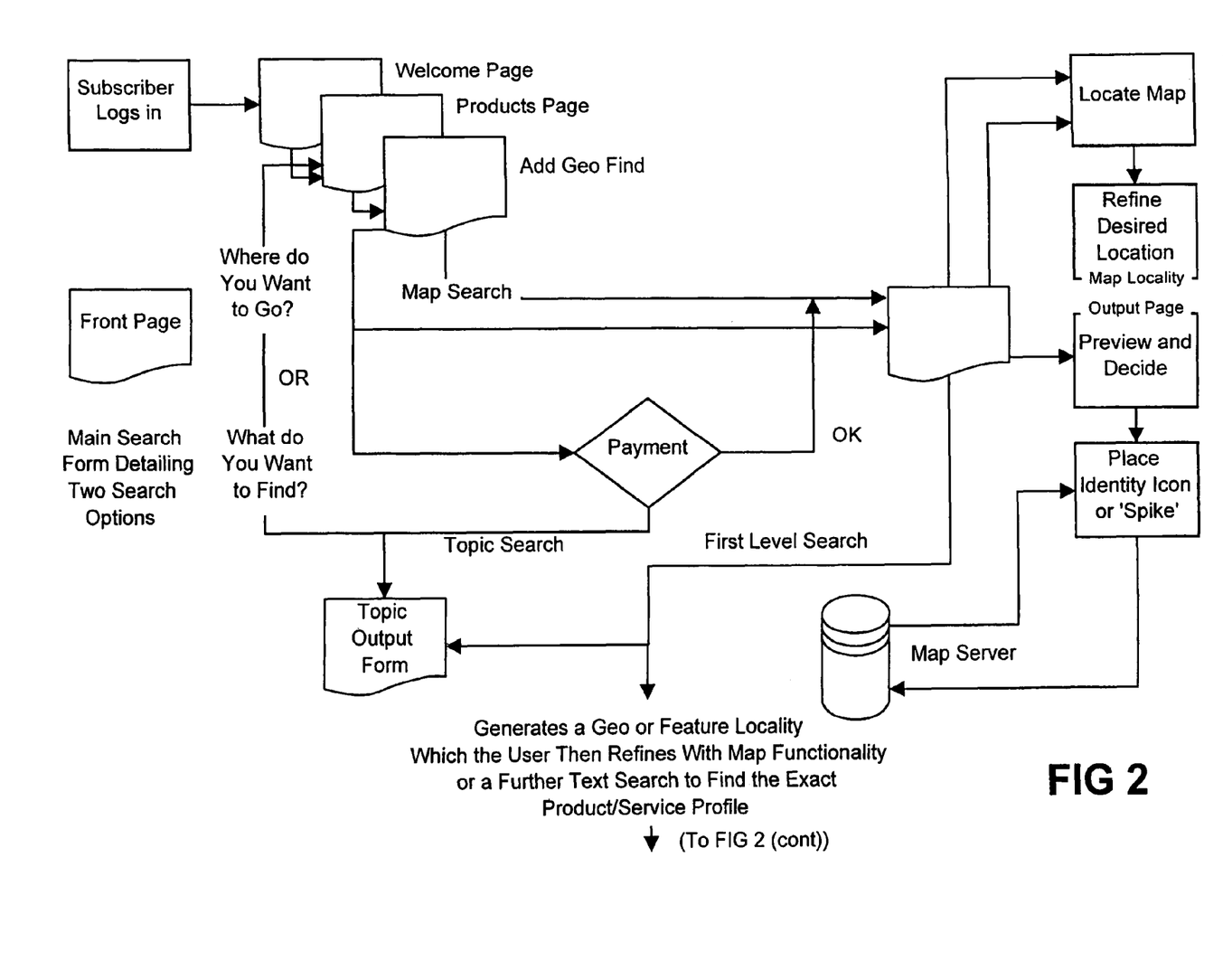
FIG. 2 is a flowchart of the search process, in which a person searches the database system according to an embodiment of the present invention.

The user can also search by:

(a) selecting a point and then specifying a distance from that point for that search together with the subject of the search;

(b) selecting any object (for example, a road, river or feature) and nominating a distance from it together with the subject of the search;

(c) drawing an area on the map and searching in that area; or (d) nominating a series of features, such as roads, railways lines and coastlines, which enclose an area and accordingly searching within the enclosed area.

In response to a search, the system produces a list of successes which can be opened by clicking on them.

A subscriber may have more than one profile. The subscriber accesses and edits these profiles from a "subscriber's home page", which is a web page at which the subscriber may choose to: Change the password Amend the display on the subscriber's profile "frontside" (the part which can be seen by "visitors")

Locate or relocate the business on the mapping system

Establish or change search criteria

Purchase and establish a banner ad on a screen of mapping information

Purchase and establish a classified ad

Request information from the library section of the site

Request future information from the magazine section of the site

Read information found by library/magazine sections

Receive messages from visitors; turn feature on and off

Receive and send email

As part of entering a subscriber profile, the subscriber clicks on an icon which relates to locating the subscriber's "spike" on a map. This icon produces an address template which brings up the appropriate address on the mapping system, and the subscriber has an opportunity to move the "spike" to the exact desired location or relocate the "spike" for any reason.

The "subscriber's home page" and the "subscriber's profile page" are just two elements of a "super site", which includes a number of profiles relating to a particular type of industry. There are a number of super sites, each relating to a different industry. By way of example, one super site may relate to tourism. The elements of a super site include a front page, an about us/products/services page, a search page, a map output page, a refine search page, subscriber's home pages, subscriber's profile pages, a classifieds section, a magazine section, payment pages and administration pages.

The front page of a super site includes a welcome message, feature items, what's new items and links to all sections of the super site. The search page includes the fields: street number, street name, suburb, state, product/service input box, postcode and distance. Subscribers may enter various searchable words descriptive of their businesses, and users can conduct searches using these key words. Thus, for example, in the tourism super site a subscriber who operates a restaurant may choose to use such key words in relation to their businesses as "restaurant", the restaurant name, "a la carte", "French cuisine", "Diners Club" and "open 7 days".

The map output page includes an initial map image, radial/perspective functionality, proximity input boxes, directional buttons (panning, re-centering), a refine search button, and a search again button. The refine search page enables a user to "drill down" on a street address, change the radial proximity parameters, change the zoom factor, conduct feature searches (e. g. where is the nearest?), and pan or re-centre the map. The map output page also allows a user to click on any point and search within any distance. This allows the user to click on any object and search with a pre-determined distance by clicking on an object and choosing to search within any distance of the object. Alternatively the user can mark out the nominated area to search or nominate a series of features that define an area.

The different super sites are combined into an overall website, which may be distributed across multiple servers and multiple geographical locations and URLs. Each super site preferably relates to a different industry. These can be classified in any suitable way. One suitable classification system which has been devised for use with an embodiment of the invention is as follows:

Automotive
Building and Construction
Communications and Information Technology
Culture and Recreation
Education
Emergency Services and Defence
Energy
Food and Beverages
Government Health
Infrastructure
Law
Manufacturing
Money
Primary Production
Real Estate
Retailing
Services
Science and Technology
Tourism
Transport, Distribution and Storage There will of course be overlap between different super sites, and some businesses may be registered in more than one super site. A suitable breakdown of the world's geographical regions is as follows:

Canada and Alaska
Mexico
Central America/Caribbean
Northern Latin America
Brazil
Southern Latin America
Pacific Islands
Australia
Indonesian Archipelago
South East Asia
Indochina
Far Eastern Asia
Korean Peninsula
Japan
Russia
Southern Africa
Central Africa
North Africa
Middle East
Persia and Western Asia
Indian Subcontinent
Scandinavia
Eastern Europe
Asia Minor and the Caucasus
Greece and the Balkans
Italy
Iberian Peninsula
France
British Isles
The Low Countries
Germany
Central Europe In a preferred implementation, each of the above regions has an Internet site according to the invention (a "Super Site"), including super sites for each of the 21 industry groups identified previously.

The components of the overall website include the super sites, a master configuration module, an administration module, a reporting module, a notification module, a payment module, a map server, and one or more databases.

The master configuration module represents the top layer of the web site configuration. It includes tools for configuring the other modules. The administration module enables an administrator to: configure a new super site, configure a new customer, grant permissions, configure a new template, configure a new product, configure a new report, configure a new content section, associate a graphics suite by coding image names with a super site code, publish a super site, configure security roles and levels, and view and edit records.

The reporting module allows configuration of reports. Within a super site, this includes reports of subscribers, transactions, products, banners served, classifieds served, and search results.

The notification module enables notification messages to be sent to customers to alert them to such things as due dates for payment of renewals on products. The payment module enables subscribers to pay fees using a credit card number.

The map server graphically displays the positions of selected businesses on a map. The map displays suburb and street information with icons indicating the position of the selected businesses. The map server enables searching by state, suburb, street, region, zipcode or by using a user-defined distance. This user-defined distance can be the radius from any user-defined geographical point, defined by a user drawn area or defined by nominating a series of features which create the area. Each subscriber profile is entitled to have a location marker, indicating to the map server the precise geographical location of the subscriber's business.

The website includes one or more databases which store information about the products, subscribers, transactions and content. The product database includes product tables, profile tables, banners, classifieds, and magazines. The subscriber database includes subscriber details, associated tables with products and transactions, and location-coded details. The transaction database is a repository for all transactional records, with the possible exception of financial transactions if such transactions are conducted through a third-party secure payment service. The content database includes magazine content, banner ad content, profile content and classified content.

The use of the invention in relation to Internet advertising allows advertising and in particular banner advertising to be targeted to the geographical location of the particular Internet user. The advertiser can track the user to identify their geographical location or alternatively the user may submit their geographical information. This will allow the Internet user to receive advertising which is directly relevant to his geographical area.

The advertiser may specify the exact geographical boundaries to which they wish their Internet advertising to be directed. This has the advantage of making Internet advertising available to small businesses that have a localised customer base. Advertisers can target as broadly as the whole nation or as accurately as the local neighbourhood (to less than a square km) making Internet advertising to these small local advertisers for the first time.

The invention also enables advertisers to target different advertising campaigns to different geographical regions.

A further aspect of the invention enables credential information to be added for at least some of the name entries in the database. The credential information is supplementary to the geographical data and other data such as contact details and a description of the goods and/or services offered by the business, organisation or individual. The credential information includes a word, code, qualification or other indicator which is attached to the information associated with a database name entry. The credential information should be added to selected name entries by someone other than the business, organisation or individual to whom the credential information applies.

Therefore, the database includes two types of information:
(a) what a business says about itself, i.e. the type of business, business location, trading hours, etc., also referred to as "discovery information"; and
(b) what a third party says about the business, also referred to as "credentialing information".

A simple example of discovery information is information registered in the system by a hardware store. The discovery information includes a geographical location identifier which indicates the geographical location at which the hardware store is located. The hardware store is responsible for management of its own discovery information, for example, the hardware store would update its listing if the store is moved to another location.

A simple example of credentialing information is a brand owner that sells a particular brand of product through hardware stores can use the system to add a credential (in this case the brand) to the discovery information relating to hardware stores that sell its products. The credentialing information can be displayed from the brand owner's (i.e. the credentialing entity's) website to show showing all the hardware stores that stock that particular brand. Similarly, hardware stores that sell that particular brand can also be identified or discovered through a general search via the system website when the user searches for that brand.

Since it is highly unlikely that every hardware store in the economy would go to the effort of displaying online keywords for each and every brand stocked by the store, this system of data credentialing allows the brand owner to provide the credentialing information to every store that sells its products. The brand owners do not need to concern themselves with the management of the discovery information relating to each of the stores that stock its products, this function is carried out by the stores themselves. All that the brand owner needs to do is to associate the credentialing information (in this case the brand) with a list of ABNs (Australian Business Numbers) of the entities that own the stores. The credentialing entity would have access to the stores ABNs or similar business identifier since the brand owner deals with them.

Since credential information is added by a third party, it is intended to increase the user's interest and/or confidence in a registered business, organisation or individual. As described in the above example, in one particular embodiment the credential information is added to the database by another registered business which is a brand owner. The brand owner adds credential information to all other businesses registered in the database that on sell goods and/or services under the brand.

Adding brand credential information to the database is advantageous for the user since the user is enabled to restrict the results of a search for a business in a specified locality further by examining any credential information associated with the businesses, organisations and/or individual listings that have been discovered using a particular search query. For example, a user can filter the results of a search for clothing stores within 10 kilometers of the user's location to clothing stores which sell the user's favourite brands.

Another example of useful credential information is added by an organisation registered with the system to indicate those businesses and/or individuals registered which are members of the organisation. For example, Professional Organization X may add credential information to all other businesses, organisations and individuals that are members of the Professional Organization X. This enables a user to filter search results to give precedence to business listings which are members of a professional or industrial organisation if desired. This may serve to increase the user's confidence in those businesses and/or individuals. On the other hand, the organisation is provided with a simple and effective tool for promoting their members.

Yet another example of credential information is added by a credit card provider registered in the database to indicate those businesses, organisations or individuals which accept a particular credit card. This enables users seek out those businesses and individuals which accept a credit card that the user carries. For example, the user may search for a local restaurant that accepts BRAND X Credit Card.

In an alternative example, a credit reference agency adds credential information indicating the financial status of other registered businesses, organisations and/or individuals. In this case, the credit reference agency may elect to display the credential information only to users who pay to view the information. Moreover, the credential information that a user must pay to view may be accessible only via the credit reference agency's own website to which the user is directed by the online geographical system.

The association of credential information with name entries for registered businesses, organisations and/or individuals is advantageous for the user, the business being credentialed and the credentialing business. As indicated above the user is provided supplementary information on credentialed businesses which may serve to increase the user's interest on the credentialed business. The credentialing business benefits in increasing user interest in businesses which for example offer for sale its branded goods and/or services, or accept its credit card.

The credentialing entity does not play an active role in maintaining the other information relevant to the businesses, organisations or individuals being credentialed including their geographical locations, and descriptions of their goods and/or services (i.e. discovery keywords) stored in the database, associated with the name entry. This data is managed by the relevant business, organisation or individual. Accordingly, the credentialing entity derives the benefit of adding its credential to various businesses, organisations and individuals already registered in the database without the added burden of having to maintain a comprehensive and up to date listing of its resellers, credit card merchants or members businesses as the case may be.

Credential information is added to the database by associating the credential with a unique business identifier such as an ABN (Australian Business Number) or similar identifier associated with the business to be credentialed.

The credentialing entity also controls the discovery of the credential information by a user. In some cases, the credentialing business may restrict access to the credential information to users who access the credential information through the website of the credentialing business. Alternatively, a user may be enabled to view the credential information through any search of the online geographical system. For example, a brand owner and credit card provider has an interest in having potential purchasers of its branded goods and/or services or users of its credit card discovered as readily as possible, whilst a professional organisation may choose to only offer access to credentials of other registered businesses and individuals via the organisation's website.

Accordingly, it is to be understood that the credentialing information may include various types of credentials from other member businesses, in respect of the business, organisation or individual in question, or the goods or services offered by the business, organisation or individual in question. Moreover, the manner in which the credential information is discovered by an Internet user is controlled by the credentialing entity.

In combining the self management of discovery information relating to each registered business with the credentialing information provided by a third party, the reliability and currency of the information is improved. For instance, whilst it is not within the competency or resources of individual hardware stores to manage the discovery of each and every one of the many brands that it may sell through its store, it is in the interests of the brand owners to ensure that their brands are spatially discoverable at each location at which they are offered for sale. The combination of these two types of information means that the directory system includes data which is both comprehensive and accurate.

Finally, a further advantage of this credentialing arrangement is that in being able to view from the credentialing entity's website, all those businesses with which the credentialing has a business relationship, the credentialing business may use this data for its own internal management purposes whilst avoiding the significant overheads involved in creating and maintaining an internal database containing similar information.

Generally, the Invention can be used to locate relevant internet files of information according to either geographical or spatial location.

It is to be understood that various additions, alterations and/or modifications may be made to the parts previously described without departing from the ambit of the invention.

What is claimed is:

1. A method of categorizing businesses, organizations and individuals in order to facilitate geographically-based searching over the Internet, comprising:
    entering in a database names of businesses, organizations or individuals;
    for each name entry, registering a geographical location identifier, the geographical location identifier indicating a geographical location at which the named business, organization or individual is located;
    for each name entry, registering contact details and a description of goods or services offered by the named business, organization or individual;
    for at least one of the name entries, adding credential information with respect to the named business, organization or individual, or the goods or services offered by the named business, organization or individual,
    wherein the credential information is selected from one or more of the following:
        an indicator of one or more brands of goods and services that are offered by the named business, organization or individual;
        an indicator of one or more credit cards, each associated with a particular credit card provider, that are accepted by the named business, organization or individual;
        an indicator of one or more professional or industrial organizations of which the named business, organization or individual is a member; and
        financial data pertaining to the named business, organization or individual, and
    the credential information is added by another named business, organization or individual registered in the database that is different from the named business, organization or individual with which the credential information is associated.

2. The method according to claim 1, wherein the another named business, organization or individual adding the credential information is authorized to add the credential information.

3. The method according to claim 2, wherein the credential information that is the indicator of one or more brands of goods or services that are offered by the named business, organization or individual is added by the another named business, organization or individual that is a brand owner of one of the one or more brands.

4. The method according to claim 2, wherein the credential information that is the indicator of one or more credit cards accepted by the named business, organization or individual is added by the another named business, organization or individual that is a credit card provider associated with the one or more credit cards.

5. The method according to claim 2, wherein the credential information that is the indicator of one or more professional or industrial organizations of which the named business, organization or individual is a member is added by the another named business, organization or individual that is the one or more professional or industrial organizations.

6. The method according to claim 2, wherein the credential information that is the financial data pertaining to the named business, organization or individual is added by the another named business, organization or individual that is a credit reference agency.

7. The method according to claim 1, wherein each named business, organization or individual is provided with tools to build an associated website.

8. The method according to claim 7, wherein the website associated with the named business, organization or individual is accessed via one or more industry specific websites, and the one or more industry specific websites each represent an industry in which the named business, organization or individual operates.

9. The method according to claim 8, wherein each industry specific website is accessed via a geographic region specific website, wherein the geographic region specific website represents a geographic region in which the named businesses, organizations or individuals accessed via the industry specific website operate.

10. The method according to claim 7, wherein the credential information for a named business, organization or individual is accessed via a website of the another named business, organization or individual that added the credential information.

11. The method according to claim 1, wherein a user pays to access the credential information.

12. The method according to claim 1, wherein access to the credential information is controlled by the another named business, organization or individual that added the credential information.

13. The method according to claim 1, wherein a user interrogates the database by nominating a catchment area by reference to one or more geographical points to identify name entries corresponding to named business, organizations and individual located within the catchment area nominated by the user.

14. The method according to claim 13, wherein the user refines results of the database interrogation by nominating criteria including credential information.

15. A system for facilitating geographically based searching for businesses, organizations and individuals over the Internet, the system comprising:
    an administration module for managing registration of a plurality of subscribers each corresponding to a business, organization or individual;
    one or more databases for storing information relating to subscribers including at least a name entry and one or more of a geographical identifier indicating the geographical location at which the subscriber is located, contact details and a description of the goods or services offered by the subscriber, and credential information in respect of a first subscriber, the credential information being added by a second subscriber that is different from the first subscriber; and
    a map server for graphically displaying the geographical location of each subscriber on an electronic map and for enabling geographically based interrogation of the database based on location information.

16. The system according to claim 15, wherein the map server enables searching by state, suburb, street, region, zipcode or a user defined catchment defined by a series of user defined points or a user defined distance from a user defined point.

17. The system according to claim 15, further comprising a search module to enable a user to interrogate the database to identify a subscriber that is located at a geographical location that falls within a catchment area nominated by the user.

18. The system according to claim 17, wherein the search module further enables the user to refine results of the database interrogation by nominating criteria including credential information.

19. The system according to claim 15, wherein the credential information is selected from one or more of the following:

an indicator of one or more brands of goods and services that are offered by the subscriber;

an indicator of one or more credit cards, each associated with a particular credit card provider, that are accepted by the subscriber;

an indicator of one or more professional or industrial organizations of which the subscriber is a member; or financial data pertaining to the subscriber.

20. The system according to claim 15, further comprising a website building module to enable each subscriber to create a subscriber website, wherein the subscriber website is accessible via one or more industry specific websites that each represent an industry in which the subscriber operates, and each industry specific website is accessible via a geographic region specific website representing a geographic region in which the subscriber accessed via the industry specific website operates.

* * * * *